Nov. 8, 1960     S. G. BEST     2,959,002
TURBINE ENGINE FUEL CONTROL

Filed Oct. 23, 1957     2 Sheets-Sheet 1

INVENTOR
STANLEY G. BEST
BY *Leonard F. Weklind*
ATTORNEY

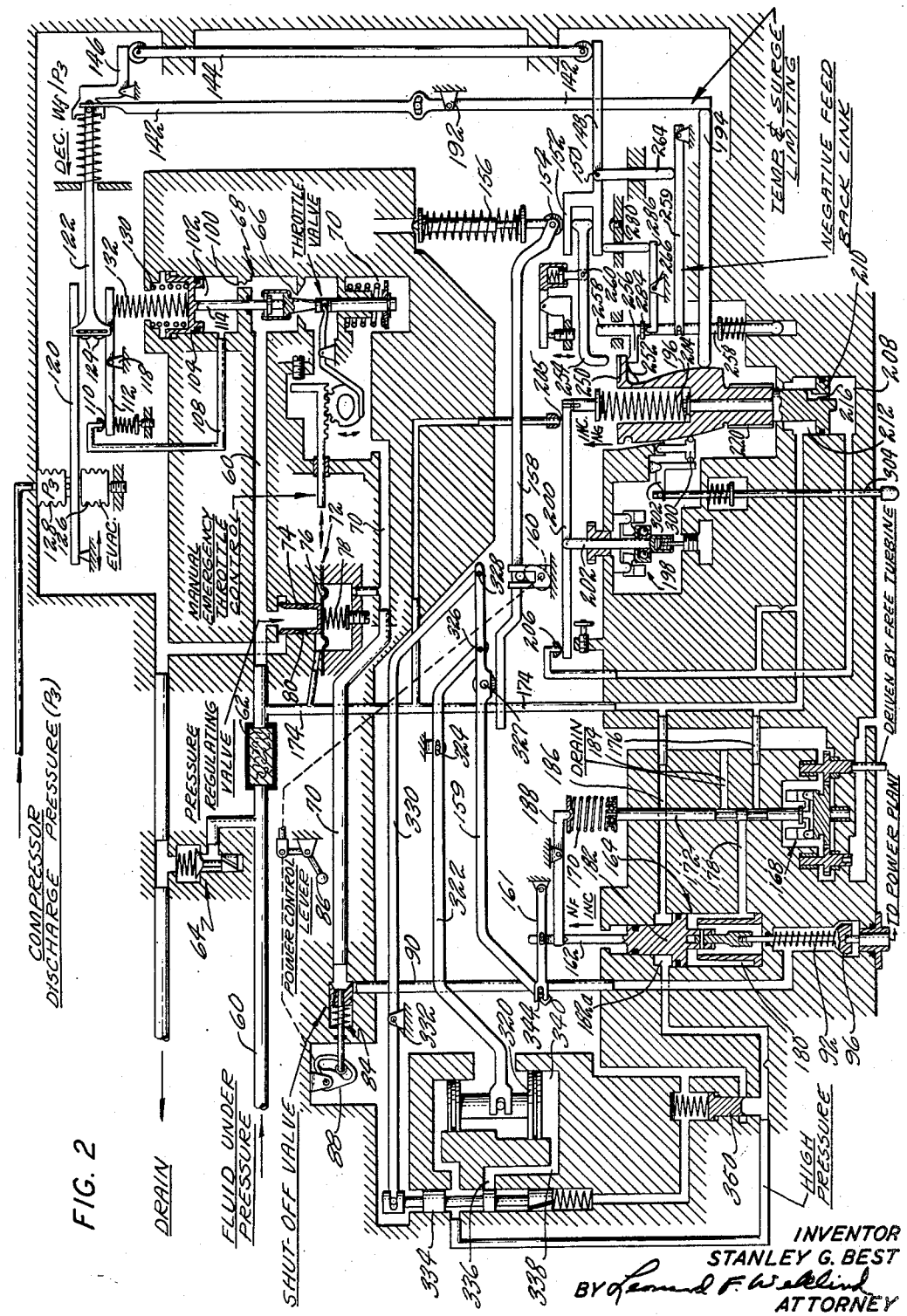

United States Patent Office 2,959,002
Patented Nov. 8, 1960

2,959,002
TURBINE ENGINE FUEL CONTROL

Stanley G. Best, Manchester, Conn., assignor to United Aircraft Corporation, East Hartford, Conn., a corporation of Delaware Filed Oct. 23, 1957, Ser. No. 691,936

2 Claims. (Cl. 60—39.16)

This invention relates to fuel controls and more specifically to fuel controls for turbine type power plants and is an improvement over patent application Serial No. 528,879 filed August 17, 1955, by Thomas P. Farkas, now Patent No. 2,909,895.

It is an object of this invention to provide a fuel control for a multiple turbine type power plant whereby the fuel is regulated primarily as a function of the speed of one turbine multiplied by a function of compressor discharge pressure. The speed function is in turn modified by a mechanism responsive to the speed of the second turbine and includes a governor controlled cam which has a feedback connection to the governor.

A primary object of this invention is to prevent hunting of the control during transient operation while still maintaining high accuracy during steady state operation of the power plant. Thus, the control provides temporary operation on a relatively shallow sloped governor droop line during transient operation and after a time interval, operation on a steep governor droop line is resumed for steady state conditions.

These and other objects of this invention will become readily apparent from the following detailed description of the drawings in which:

Fig. 2 is a schematic illustration of a fuel control particularly adapted to controlling a turbine of the type shown in Fig. 1;

Figure 1:
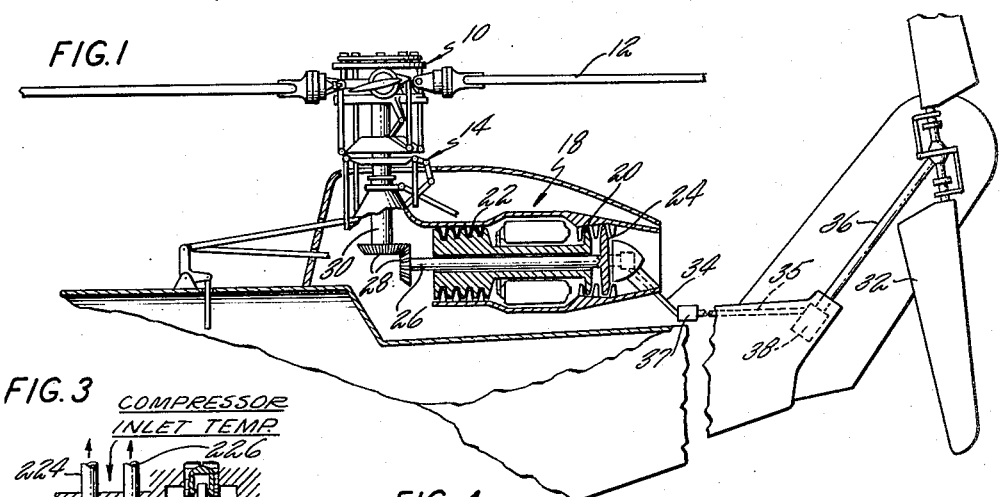
Fig. 1 is a fragmentary view of a helicopter having a turbine power plant installation according to this invention.

Referring to Fig. 1, a typical helicopter installation for a turbine type power plant is illustrated. The helicopter may have a main rotor 10 including variable pitch blades 12 whose pitch can be controlled by linkage 14 and in turn moved by main pitch control link 16. The particular operation of the various parts is more clearly illustrated in Patent No. 2,811,324 which issued on October 29, 1957.

As seen herein, a turbine type power plant is generally indicated at 18. The power plant has a first stage turbine 20 which drives the compressor 22. A second stage turbine 24 has no connection to the turbine 20 or the compressor 22 but it drives the rotor 10 via the shaft 26, gears 28 and shaft 30. Since the second stage turbine 24 has no direct connection to the remainder of the power plant, it is referred to as a free turbine. The speed of this free turbine 24 is referred to hereinafter as ($N_F$). The free turbine 24 also drives a tail rotor 32 via shafts 34, 35, 36 and couplings 37 and 38. In order to properly control this power plant rotor combination it is necessary to sense the speed of the free turbine 24 ($N_F$) and the speed of the turbine 20 including the compressor 22 and the speed of the latter is hereinafter referred to as ($N_G$). It is also necessary to sense compressor inlet temperature and compressor discharge pressure. The various ways in which these parameters of power plant operation are utilized in controlling a fuel flow is more clearly described in connection with Fig. 2.

The fuel control of this invention is schematically illustrated in Fig. 2. Generally, the control meters fuel as a function of speed multiplied by a function of compressor discharge pressure. The speed of the free turbine ($N_F$), in other words, the turbine that drives the helicopter rotor, is utilized for steady state control. Maximum limiting however is induced as a force in the system as a function of the speed of the turbine which drives the compressor and a function of the inlet air temperature and compressor discharge pressure. These basic parameters of power plant operation each function to control fuel control in a manner to be described hereinafter.

Referring to Fig. 2, fuel under pressure flows into the main line 60 and through a filter 62. The pressure relief valve is generally indicated at 64 and prevents fuel pressure from exceeding a given value. Fuel from the main line 60 is metered through an orifice 66 in the main throttle valve generally indicated at 68. The metered fuel flows past the orifice 66 and then to the line 70. A pressure regulator valve 72 is shunted across the throttle valve inlet line 60 and the valve outlet line 70. The pressure regulating valve 72 maintains the pressure drop across the metering orifice 66 at a predetermined value. The pressure regulating valve 72 includes a piston 74, a diaphragm 76 and a spring 78. The bottom of the diaphragm 76 is exposed to fuel pressure on the downstream side of the throttle valve. The top side of the diaphragm is exposed to fuel pressure at the inlet side of the throttle valve. Fuel under pressure from the main line 60 flows into an orifice and land 80 into piston 74. The piston 74 has a lapped fit with its surrounding wall but the fit is not sufficient to prevent passage of fuel to the upper side of the diaphragm 76. By passing high pressure fuel to the upper side of the diaphragm in this manner, a damping effect is provided. Metered fuel in the line 70 then flows past a manual stopoff valve generally indicated at 84. The shutoff valve 84 is operatively connected to the main power control lever 86 by means of a lost motion member 88. The shutoff valve is intended to positively cut off fuel when the power control level is moved to a closed position. Metered fuel flows past the shutoff valve 84 into the line 90 and then into the chamber 92 past an overspeed shutoff valve 96 and then to the power plant. The operation of the overspeed shutoff valve 96 will be described hereinafter.

In the main throttle valve 68 the fuel under inlet pressure passes through a restriction 100 and into the chamber 102 wherein it acts on the bottom of a piston 104. This high pressure fuel flows into line 108 and thence out of an orifice 110. The rate with which the fuel is discharged from the orifice depends upon the position of the lever or valve member 112. For a given opening of the orifice 110 there will be a certain pressure in the chamber 102 acting on the piston 104. It will be noted that movement of the piston 104 causes movement of the integral throttle valve stem 114 to thereby vary the area of the metering orifice 66. The lever 112, which varies the opening of the orifice 110, pivots about the point 118 and controls the position of the servo piston 104 and hence the opening of the throttle valve. The lever 112 is, in turn, positioned by a combination of two main forces, one of these forces is that produced in the lever 120 and the other force is produced by the lever 122 through its rollers 124. The lever 120 has a force imposed upon it by means of a pair of bellows 126 and 128. The bellows 126 is evacuated while the inside of bellows 128 is exposed to compressor discharge pressure ($P_3$) so that these bellows impose a force or signal in lever 120 as a function of compressor discharge pressure absolute. The lever 122 has a force imposed thereon for a function of speed, or speed and temperature, in a manner to be described hereinafter.

When compressor discharge pressure increases, the force on lever 120 is increased in a downward direction thereby causing the rollers 124 to move down and the right hand of lever 112 to move downwardly a slight increment thereby decreasing the flow from the orifice 110. This increases the pressure in the chamber 102 beneath the piston 104 thereby moving the piston 104 in an upward direction against the force of the heavy spring 130. This results in an increase of the opening of the main throttle valve. This upward movement of the throttle valve stem 114 and the servo piston 104 causes an increase in force on the right-hand end of lever 112 through the action of a force feedback spring 132, and restores to their balanced position the members 112 and 120.

Referring again to the link 122 of the force multiplying mechanism, the rollers 124 permit the link 122 to move to the left or right in response to motion of the vertical link 142. This motion of link 122 varies the mechanical advantage of the links 112 and 120 such that there will be a different throttle valve setting for a given force application on the links 112 and 120.

The link 122 is moved to the left or right via the link 142 in response to one or more of several parameters of power plant operation depending on whether the control is in steady state operation or under maximum limiting operation such as during acceleration overspeed or underspeed. The link 122 is also controlled by the vertical link 144 which actuates a pivoted bell crank-type member 146 through link 142. The vertical link 144 is operated by a member 148 which is pivoted at 150 intermediate the ends thereof and has its left end terminated in a bifurcated portion 152. The portion 152 is engaged by a roller 154 which is backed up by a spring 156 and is located at the right-hand end of a bar 158. The bar 158 is pivoted about a cam 160 which cam is rotated by the power control lever 86. The left-hand end of the bar 158 is connected by links 159 and 161 to a servo motor generally indicated at 164. The servo piston 182 provides a motion proportional to speed of the free turbine ($N_F$) such that combined with the desired speed setting of the cam 160, the right-hand end of the bar 158, including the roller 154, is moved, rotating link 148 about pivot 150 and thereby transporting vertical rod 144 which then would be proportional to speed error. This motion or speed error in turn is transmitted through the bell crank 146 and to the rod or link 122 to the throttle mechanism so as to adjust the throttle valve in a manner to be described. This speed error signal is the main governing signal of the fuel control.

This governing is accomplished by the governor generally indicated at 168 in the lower left-hand corner of Fig. 2. The flyball governor 168 is driven by the free turbine or the turbine which drives the rotor of the helicopter, or the propeller in the case of a turboprop type installation. The flyball force of the governor 168 is opposed by a spring 170 such that the servo valve 172 moves up or down in response to a force unbalance allowing either high pressure fluid to flow from the line 174 to the line 176, then to the line 178, to the chamber 180, to the bottom of the servo piston 182; or low pressure fluid to flow from line 178 through the pilot valve to line 184. It should be noted that the chamber 182A of the servo piston 182 is connected continuously to high pressure fluid via the line 186.

Movement of the servo piston 182 readjusts the force exerted by the spring 170 through the operation of lever 188 to rebalance the force exerted by the governor flyballs and stop the motion of the servo valve 172 and the servo piston 182. From the foregoing, it is apparent that the position of the servo piston 182 will at all times be proportional to the free turbine speed ($N_F$). It is further apparent then that the left-hand end of the longitudinal bar 158 is subjected (via links 159 and 161) to a position proportional to free turbine speed. While intermediate the ends of the bar 158, the cam 160 is positioned in proportion to desired speed whereby the right-hand end of the bar 158 provides a signal proportional to the speed error at any particular instant. The right-hand end of bar 158 including its roller 154 sends the speed error signal through the bifurcated end of the bar 162 of the bar 148 to the vertical link 144, etc. to position the throttle valve accordingly. To follow a typical operation of the speed signal, consider the condition where the load on the helicopter rotors is suddenly reduced for some reason which causes the rotor and the free turbine to overspeed. In this event, the flyballs of the governor 168 will move outwardly forcing the servo valve 172 in an upward direction thereby allowing high pressure fluid to act on the body of the servo piston 182 and moving the servo piston upwardly. Through the action of the lever 188, the spring 170 will be compressed thereby rebalancing the flyball force and stopping the motion of the pilot valve 172 and the servo piston 182. However, the new position of the servo piston 182 will be transmitted through the link 162 to the bar 158 (via links 161 and 159) to vary the position of the roller 154 on the bifurcated end 152 of link 148. This motion rotates lever 148 counterclockwise on pivot 150 moving the rollers 124 toward decrease fuel flow per unit compressor discharge pressure through action of links 144, 146, 142, and 122.

The steady state governing assembly includes an overspeed valve 96 which is connected to the bottom of the servo piston 182. For a given overspeed condition and upward movement of the servo piston 182, the valve 96 will assume a closed position so as to prevent flow of fuel to the power plant. This shutoff valve 96 is necessary in a helicopter installation.

Inasmuch as the relative inertia of the power plant and rotor are such that dangerous overspeeds might readily cause disintegration of the power plant if the normal fueling control elements had to be relied upon to suddenly decrease fuel flow under certain conditions; thus, the position of the servo piston 182 is the best indicator of an overspeed condition and acts substantially instantly to regulate or shut-off the flow of fuel.

As previously mentioned, the rollers 124 and the link 122 are also subject to motion from the vertical link 142 which is pivoted intermediate its ends at 192 during acceleration limiting. The lower end of link 142 is engaged by a rod 194 which has its left end in engagement with a cam 196. The cam 196 is both reciprocable along its vertical axis and also rotatable about that axis. To the left of the cam 196 a governor is generally indicated at 198. The governor 198 senses the speed of the compressor, and of course, the turbine which drives the compressor. The governor 198 exerts a force on a lever 200 by means of the vertical member 202. The lever 200 is pivoted to the member 202 and the lever 200 has its right-hand end in engagement with a spring 204 while the left-hand end of the lever 200 varies the opening of an orifice 206. Hence, any variation in compressor speed changes the area of the orifice or valve 206 thereby changing the pressure in the chamber 208 at the lowermost portion of the three-dimensional cam 196. The pressure in the chamber 208 controls the position of a piston 210 which, in turn, moves the cam 196 vertically.

The chamber 212 on the upper side of the piston 210 is continuously fed high pressure fuel via a line 174. This high pressure fuel passes through a restriction 216 into piston 210 and thence to chamber 208. The pressure in the chamber 208 is varied in accordance with the opening of the orifice 206 which opening, in turn, is controlled via the governor 198.

In order to balance out any fluid pressure unbalancing forces, an orifice 205 is provided to cause fluid to impinge on the right-hand end of lever 200 to balance the force of orifice 206. As in the previously described servo mechanism, any change in position of the servo piston 210 and its attached three-dimensional cam 196 will vary the compression of the spring 204 to rebalance the system, that is, to restore the opening of the orifice 206 whereby the system is in balance. Thus, the three-dimensional cam 196 has a different axial position for every compressor speed.

Figure 3:
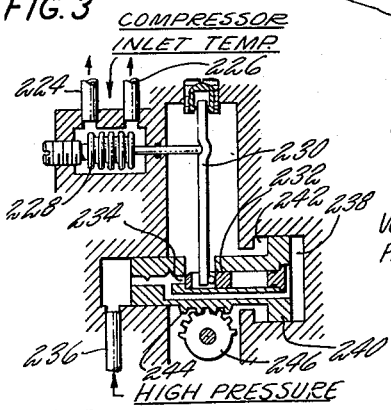
Fig. 3 is a schematic illustration of the temperature sensing servo mechanism.

The three-dimensional cam 196 is rotated about its vertical axis through a gear 220. The mechanism for rotating the cam is schematically illustrated in Fig. 3. Thus, compressor inlet air is circulated through the lines 224 and 226 so that the bellows 228 expands or contracts in relation to the temperature of the inlet air. The bellows 228 is linked to a vertical rod 230 which at its lower end is connected to a servo valve 232. The servo valve 232 varies the opening of the orifice 234 which is receiving high pressure fluid from a line 236. This high pressure fuel flows to the right-hand side 238 of servo piston 240, but, the valve 232 and the orifice 234 control the pressure to the left-hand side 242 of the piston 240. Hence, any variation in position of the valve 232 varies the position of the servo piston 240 and its integral rack 244 thereby rotating the gear segment 246 which is equivalent to the gear 220 on the three-dimensional cam of Fig. 2.

The three-dimensional cam 196 also includes at its upper end topping and bottoming cam surfaces 250 and 252. These surfaces are intended to engage the left-hand end of lever 254 and the arm 256, respectively. The arm 256 is integral with a vertically movable rod 258. It is thus seen that during limiting the cam surface 196 can move the horizontal rod 194 and the cam surfaces 250 and 252 can affect the rods 254 and 256, respectively.

Assuming, for example, that the compressor speed has increased to a value where it is to be limited from further increase for optimum engine performance and safety, the topping cam surface 250 will engage the left end of the topping lever 254 and will rotate the lever 254 clockwise about its pivot 260 thereby also causing the rod 148 to move counterclockwise about its pivot 150. This motion is transmitted to the vertical link 144 and bell crank 146 to the horizontal link 142 to move it in a decreased fuel flow per compression discharge pressure direction.

Movement of the main cam 196 in a downward direction in response to a decrease in compressor speed toward a dangerously low r.p.m. will cause the bottoming cam surface 252 to engage the arm 256 and cause downward motion thereof along with the rod 258. This eventually causes the rod 286 to rotate counterclockwise about its pivot 266 thereby forcing the left-hand end of the bar 148 upwardly. This motion is transmitted to the vertical link 144 through a member 146 and then to the horizontal link 122 which is moved in a fuel per unit compressor discharge pressure increase position. Thus, the control provides a "topping" and "bottoming" function to prevent excessive speed or too low a speed.

Maximum and minimum fuel flow limiting for a transient operation of the engine is described immediately following. During an acceleration of the engine it is desirable to have the largest fuel flow per unit compressor discharge pressure possible in order to provide fast response to the pilot's motion of the power lever. In order to prevent compressor surge and overtemperature, however, it is necessary to limit the maximum fuel flow for given conditions. Herein, the limiting is accomplished as a schedule of fuel flow in proportion to a function of compressor speed, compressor inlet temperature and compressor discharge pressure. Thus, as seen in the lower right-hand corner of Fig. 2, the horizontal link 194 assumes a position as a function of compressor speed and compressor inlet temperature through the main cam 196. The link 194 in turn transmits a position to the vertical link 142 which imposes a limit on the horizontal link 122 to prevent its further movement toward an increase fuel flow per unit compressor discharge pressure. Therefore, if the power control lever 86 calls for an increase speed through its cam 160, the right-hand end of the rod 158 tends to move upwardly thereby rotating rod 148 clockwise about its pivot 150 thereby permitting the vertical link 144 to move downwardly and the main horizontal link 122 to move toward an increase fuel flow per compressor discharge pressure. This increase fuel flow per unit compressor discharge pressure signal, however, will be limited by the particular position of the limiting links 194 and 142, depending upon the particular compressor speed and inlet temperature existing at that instant.

Minimum fuel flow per compressor discharge pressure is established by a stop 280 which engages the left-hand end of link 148. The bottoming cam 252 also plays a role when the governor portion of the control calls for a decrease in fuel flow as a result of an overspeed of the power turbine and the speed of the engine is decreasing in value. The bottoming cam surface 252 will contact arm 256 and via rod 258 will move the left-hand end of the negative feedback link 259 in a downward direction thereby allowing link 264 to move downward. This moves pivot 150 downwardly, thereby permitting the right side of rod 148 to move in a downward direction this calling for an increase in fuel flow at a rate which is increasing with a decrease in engine speed. The negative feedback link thus provided is more fully described in application Serial No. 528,877 filed August 17, 1955, and particularly in connection with Fig. 4 of that application.

Assuming that the pilot calls for 100% rotor speed by means of rotating speed setting cam 160 in a suitable manner, the engine will operate at 100% engine speed, if the expected design load is present at the rotor of the helicopter. If the load on the helicopter rotor and consequently the load on the power or free turbine should decrease, the rotor and turbine combination would tend to overspeed and the governing mechanism would call for permitting the right side of rod 148 to move in a downward direction thus calling for an increase in fuel flow per unit compressor discharge pressure at a rate which is increasing with a decrease in engine speed.

Figure 4:
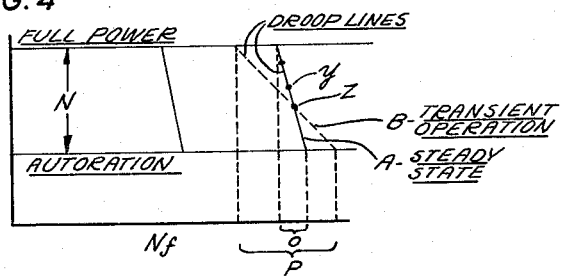
Fig. 4 is a graphic illustration of engine operating curves.

In helicopter operation it is necessary that rapid response to changes in collective pitch setting be provided and also that steady state speed variation of the free turbine ($N_f$) be limited. The curve shown in Fig. 4 illustrates the free turbine governor droop lines of the fuel control. The variation in the fuel flow versus compressor discharge pressure ratio required by the gas generator for operation over the load range is fixed by engine characteristics. A given range of fuel ratios is determined for a given range of engine loads and in design of the control correct selection of lever ratios, hydraulic pressures, etc. determines the magnitude of the fuel ratio signal provided for a given speed error (load change). The range of free turbine speed variation for a given setting (range O and P, Fig. 4) represents the steady state droop or gain of the control.

As an example, assume that speed of the free turbine is at point Z on the curve shown in Fig. 4 and that the collective pitch setting is suddenly increased. The control would immediately call for the fuel flow ratio indicated by point Y on line A where equilibrium engine operation would be sustained. The gas generator would now be operating at point Y on the steady state line whereas it had previously been operating at point Z. The speed ($N_f$) of the free turbine cannot return exactly to its original value at point Z since that would require that the fuel control call for the same fuel flow ratio which existed prior to any change, an impossibility in view of the increased load on the engine.

If the control were modified so as to provide a droop line such as that indicated by line B (Fig. 4) operation would be similar. It will be noted, however, that over the range of possible engine loads from autorotation to full power the speed of the free turbine will vary a great deal more if a control line such as line B were incorporated rather than line A. Note also that as a consequence of the difference in slopes a given change in speed will result in a much greater change in fuel flow on line A than on line B.

As mentioned above, the slope of these lines is indicative of the gain of the control. For transients it is desirable to have a high enough gain to provide rapid response and yet not endanger the stability of the system. With the control at hand it has been found that a gain such as that of line A is too high for good transient response in that the increment of fuel flow added or subtracted for a given change in speed causes oscillation about the new $N_f$ speed. It would therefore be desirable to provide a control characteristic as shown by line B which represents a suitable control gain for transients. As indicated above, however, it is necessary to limit variation in $N_f$ (O and P, Fig. 4) for a given speed setting. To satisfy the second criterion, then, line A is the more desirable characteristic. The lag-lead mechanism of this invention enables operation of the control so that for steady state conditions a gain as evidenced by line A is effective and for transient conditions a gain as evidenced by line B is effective. Thus, a different slope or a different fuel flow rate of change per unit speed change is obtained.

Figure 5:
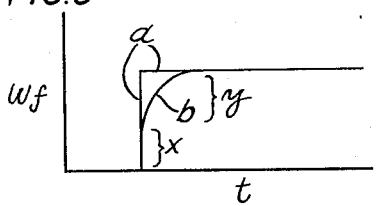
Fig. 5 is a graphic illustration of fuel flow versus time.
Figure 6:
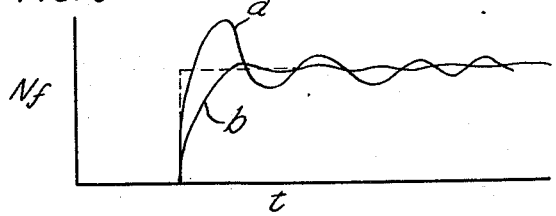
Fig. 6 is a graphic illustration of the free turbine speed versus time showing a speed change with and without this invention.

Fig. 5, line $a$, illustrates the resulting fuel flow signal to the gas generator, which would result if the r.p.m. were suddenly decreased in step fashion or if speed setting were suddenly increased but shaft speed of control held constant, using no lag-lead and droop line A of Fig. 4. In Fig. 6, line $a$ shows the effect on free turbine speed of such a fuel flow signal if the response of Fig. 5 was not rounded off; in other words, the full sensitivity is obtained immediately rather than through a lag. Oscillation of the free turbine speed as illustrated by Fig. 6 about its new value is the condition which is unsatisfactory from a stability standpoint. Line $b$, Fig. 5 indicates that the latter portion of the fuel flow signal has been slowed down, and line $b$, Fig. 6 shows the resulting change in free turbine speed. This is the response which the lag-lead control provides.

Reference is now made to the left end of Fig. 2 for a schematic illustration of the control including the lag-lead provision. As indicated above, the position of servo link 162 represents speed of the free turbine, and the right-hand end of link 158 represents speed error or fuel flow ratio. This signal was then taken through suitably described linkage to the throttle valve 68. With this type of system an off-speed condition at link 162 would normally result in an immediate and sharp fuel flow signal, but such an action results in unstable system operation for transients if the magnitude of the fuel ratio signal (gain of the system) were made high enough for satisfactory steady state operation. In other words, if the slope of the droop line were steep enough to sufficiently limit steady state variations in $N_f$, transient operation would be unstable.

The present system operates as follows. A decrease in free turbine speed evidenced at link 162 moves the left-hand end of link 159 in the downward direction. Since there is a holding force exerted by servo piston 320, link 322 connected to piston 320 will tend to remain motionless about fixed pivot 324 and hold point 326 (right-hand end of link 322) steady. Link 159 pivots about point 326 and through point 327 moving the left-hand end of link 158 in a downward direction and the right-hand end in an upward direction thereby calling for increase in fuel flow. Portion X of the curve of Fig. 5 illustrates this operation of the mechanism which may be referred to as the lead action.

Pivoting of link 159 about point 326 results in an upward movement of point 328 on the right end of links 159 and 330. Link 330 is thereby pivoted about point 332 moving pilot valve 334 in a downward direction. This results in flow of high pressure fluid through port 336 and line 338 to chamber 340 of servo piston 320. Servo piston 320 is urged in an upward direction causing link 322 to pivot about fixed pivot 324 and moves link 159 in a downward direction at its right-hand end. Link 159 now pivots about point 344 at the left end of link 159. This results in the left-hand end of link 158 being moved farther in the downward direction and a further increase in fuel flow. Link 330 is also pivoted by this action but it is now rotated in a clockwise direction and acts to return pilot valve 334 to its line on line position which corresponds to a definite fixed position of pivot point 328. This action is represented by portion Y of line $b$ of Fig. 5 and may be referred to as the lag action of the system. Thus, the steady state sensitivity is that which would result if link 159 pivoted about a fixed point at 328. With reference to the droop lines of Fig. 4 note that what the control has accomplished is the provision of a temporary fuel flow signal in accord with droop line B and a permanent fuel flow signal in accord with line A.

The rate of application of the fuel flow signal may be adjusted by providing links with various distances between points 327 and 326. For a given movement of the left-hand end of link 159, the immediate signal imposed at the left-hand end of link 158 will depend on the distance between the pivot point 326 and point 327, the point of application of the signal to link 158. The final signal will depend on the distance between the pivot point 328 and point 327. The time constant of the lag portion of the hydraulic and mechanical circuit is adjustable at 324. It should be noted that the rate at which the second portion of the signal (part $y$ of line $b$ of Fig. 5) is introduced is dependent upon the position of the pivot point 332 along with points 344, 324, 327, 326, and 328 and the rate of movement of servo piston 320.

A relief valve 350 (lower left-hand corner of Fig. 2) in combination with a restrictor in the supply line insures a constant pressure difference in the fluid on either side of servo piston 320 and thus provides a given rate of movement of the servo 320 for a given displacement of pilot valve 334. It is thus left to the variable adjustment 324 to determine the time constant of the lag portion of the curves of Fig. 5.

Figure 7:
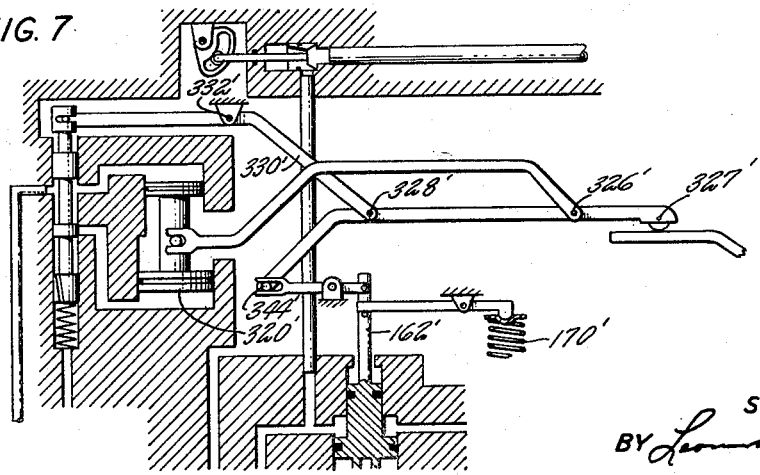
Fig. 7 is a schematic of a portion of the linkage of Fig. 2 showing a modification of this invention.

It should be noted that the mechanism for providing lag-lead may take the form shown in Fig. 7. Thus, the mechanism may be rearranged to provide a motion opposite in sense than that described in connection with Fig. 2.

Referring to Fig. 7 it will be noted that the connections 326 and 328 of Fig. 2 have now been moved to assume the positions 326' and 328' to the left rather than the right of pivot 327'.

In this arrangement immediate sensitivity depends inversely on distance between 344' and 326' and final sensitivity on distance between 344' and 328'. Note that, if desired, 328' can be made to coincide with 344' giving infinite final sensitivity, which gives isochronous governing. It should be understood that the invention is broad enough to include this alternate arrangement.

As a result of this invention, it is apparent that a fuel control has been provided having particular novel features.

Although several embodiments of this invention have been illustrated and described herein, it will be apparent that various changes and modifications may be made in the construction and arrangement of the various parts without departing from the scope of this novel concept.

What it is desired by Letters Patent is:

1. In a fuel control for a turbine power plant, said power plant having a compressor, a combustion section and a pair of turbines driven by the gases from said combustion chamber, one of said turbines driving said compressor, a source of fuel, means for regulating the flow of fuel from said source to said combustion chamber including a servo operated valve, a controller for said servo operated valve including a signal receiver, means providing a signal proportional to the speed of rotation of the other of said turbines, said signal receiver being responsive to a combined compressor discharge pressure signal and said speed signal, said means for producing a speed signal including a first link and a speed setting means forming a movable pivot intermediate the ends of said first link, a centrifugal device controlling a first servo motor, a second link having one end moved by said servo motor and engaging one end of said first link at a first point intermediate the ends of said second link, a second servo motor including a third link having one extremity thereof connected to said servo motor and the other extremity thereof connected intermediate the ends of said second link and forming a movable pivot connection located on said second link between said first point and the other end of said second link, means for controlling said second servo including a fourth link, and means connecting one extremity of said fourth link with the other end of said second link which end is opposite said one end of said second link thereby affecting the motion of said first link.

2. In a fuel control for a turbine power plant, said power plant having a compressor, a combustion section and a pair of turbines driven by the gases from said combustion chamber, one of said turbines driving said compressor, a source of fuel, means for regulating the flow of fuel from said source to said combustion chamber including a throttle valve, a controller for said valve including a signal receiver, means providing a signal proportional to the speed of rotation of the other of said turbines, said signal receiver being responsive to said speed signal, said means for producing a speed signal including a first link and a speed setting means forming a movable pivot intermediate the ends of said first link, a centrifugal device controlling a first servo motor, a second link having one end moved by said servo motor and engaging one end of said first link at a first point intermediate the ends of said second link, the other end of said first link being operatively connected to said controller for said throttle valve, a second servo motor including a third link having one extremity thereof connected to said servo motor and the other extremity thereof connected intermediate the ends of said second link and forming a movable pivot connection located on said second link between said first point and the other end of said second link, means for controlling said second servo including a fourth link, and means connecting one extremity of said fourth link with the other end of said second link which end is opposite said one end of said second link thereby affecting the motion of said first link.

References Cited in the file of this patent

UNITED STATES PATENTS

| | | |
|---|---|---|
| 1,976,659 | Dickinson | Oct. 9, 1934 |
| 2,505,796 | Sedille | May 2, 1950 |
| 2,857,741 | Evers | Oct. 28, 1958 |